United States Patent [19]

Takahashi et al.

[11] 4,325,260

[45] Apr. 20, 1982

[54] PRESSURE TRANSDUCER

[75] Inventors: Minoru Takahashi; Hitoshi Minorikawa; Masaru Iguchi; Seiichi Kashiwazaki, all of Ibaraki, Japan

[73] Assignee: Hitachi, Ltd., Tokyo, Japan

[21] Appl. No.: 117,078

[22] Filed: Jan. 31, 1980

[30] Foreign Application Priority Data

Feb. 5, 1979 [JP] Japan .................................. 54-11449

[51] Int. Cl.$^3$ .............................................. G01L 9/04
[52] U.S. Cl. ...................................... 73/726; 73/115;
73/720; 73/756
[58] Field of Search ................. 73/726, 727, 720, 721,
73/756, 115; 174/91, 151, 775

[56] References Cited

U.S. PATENT DOCUMENTS

| 1,785,861 | 12/1930 | Flogaus | 174/775 |
| 1,921,162 | 8/1933 | Kennedy | 174/775 |
| 3,520,191 | 7/1970 | Pien | 73/726 |
| 4,217,783 | 8/1980 | Ito et al. | 73/726 |

*Primary Examiner*—Donald O. Woodiel
*Attorney, Agent, or Firm*—Craig and Antonelli

[57] ABSTRACT

A pressure transducer for automobiles comprises a closed housing, a member for detecting the pressure in the suction pipe of an engine and converting the pressure detected into electric signals, an amplification circuit disposed in the closed housing, and an air passage. The air passage communicates with the atmosphere, but prevents water from penetrating therethrough into the closed housing. The air passage comprises an air hole formed in a member defining the closed housing about terminals provided for leading the electric signals out of the closed housing.

6 Claims, 3 Drawing Figures

4,325,260

PRESSURE TRANSDUCER

BACKGROUND OF THE INVENTION

This invention relates to a pressure transucer suitable to be used as a pressure detector for automobiles.

Pressure transucers are widely used for automobiles. For example, the following usages are known, that is, they are a method for keeping a most suitable combustion condition of an engine by controlling an amount of fuel injected by an electron fuel injector and the advance angle of an electron angle-advancing device, with electric signals obtained by detecting and converting the pressure difference between the pressure in the suction pipe of the engine and the atmospheric pressure or the absolute pressure, a method for compensating the altitude by detecting the atmospheric pressure changing according to the altitude, a method for indicating the pressure to the driver of an engine by detecting the pressure in the suction pipe of the engine, etc.

Hitherto, as means for indicating the suction pipe pressure of the engine of a car to the driver operating the car, a Bourdon-tube pressure gauge is used. In this case, the gauge is disposed in the car room, and the pressure in the suction pipe is introduced from the engine room into the gauge through a pressure induction pipe. In such an arrangement of the pressure gauge, if the pressure induction pipe is disengaged from the pressure gauge, a non-combustion gas, a combustion gas for EGR (exhaust gas recirculation) enter the car room to leave persons in the car room under the dangerous condition. Therefore, there is proposed a method in which only an indication board is disposed in the car boom, and a pressure detector disposed in the engine room transmits electric signals to the indication board whereby the pressure in the suction pipe is displayed on the indication board.

In the case where a pressure detector such as a pressure transducer is disposed in the engine room, particularly in case where an amplifier is incorporated in the interior of a pressure detector for amplifying electric signals obtained by converting the pressure difference detected thereby, it is necessary for the pressure detector to be waterproof, because changes in the characteristics of the pressure detector, diminished conductivity, etc. due to the rust may occur. On the other hand, if the pressure detector is made completely airtight as shown in FIGS. 2, 6, 7 of U.S. Pat. No. 3,568,124, reference pressure in the airtightly closed chamber changes according to the change of volume of the air in the closed chamber caused by the change of temperature in the surroundings of the pressure detector, therefore precision of performance of the pressure detector is greatly reduced.

SUMMARY OF THE INVENTION

An object of the invention is to provide a pressure transducer which is able to prevent water from penetrating into the interior of the pressure transducer and keep the reference pressure substantially constant, irrespective of the change of temperature in the surroundings.

Another object of the invention is to provide a waterproof pressure transducer which is high in quality and reliability, and can detect precisely pressure.

Further another object of the invention is to provide a waterproof pressure transducer which is disposed in the engine room of an automobile and can detect precisely the pressure in the suction pipe of the engine.

Briefly stated, the invention is that air passage means is provided for a pressure transducer. The air passage means can cause the closed chamber of the pressure transducer therein containing means for converting the pressure detected into electric signals to communicate with the atmosphere, and prevent water from penetrating into the closed chamber.

The air passage means, for example, comprises an air hole provided in a casing defining the closed chamber about the portion where terminals electrically connected to the converting means are exposed outside the closed chamber. The air hole communicates with the atmosphere through a plurality of gaps defined by the casing, a plug with outer terminals inserted to contact the abovementioned terminals with the outer terminals provided, and the terminals, so that the closed chamber can communicate with the atmosphere through the complicated air passage.

DESCRIPTION OF THE PREFERRED EMBODIMENTS

Figure 1:
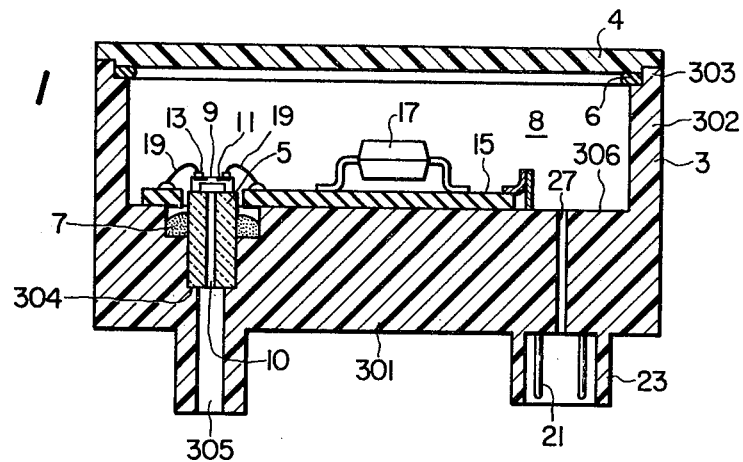
FIG. 1 is a sectional view of an embodiment of a pressure transducer according to the invention.

An embodiment of a pressure transducer for automobiles according to the invention will be described hereinafter in detail, referring to the drawings.

In FIG. 1 showing a section of a pressure transducer for automobiles, a casing 3 is made of resin, and has a bottom portion 301 and a side wall portion 302. An open end 303 of the casing 3 is closed airtightly by a cover 4 and an O-ring 6 so that a closed chamber 8 is formed. The bottom portion 301 has a hole 304 in which a glass support 5 is inserted and secured airtightly to the casing 3 by bonding means 7. The glass support 5 has hole 10 axially extending and communicating with a hole 305 made in the bottom 301 of the casing 3, thereby to provide a pressure induction passage. On the glass support 5, a silicon diaphragm 9 is joined so as to recieve a pressure introduced through the pressure induction passage. On the diaphragm 9, diffused resistances 11 and electrodes 13 are formed.

A ceramic base plate 15 is joined on the bottom portion 301 of the casing 3. An operational amplifier 17 is integrated on the ceramic base plate 15 and electrically connected to the diffused resistances 11 through lead wires 19 so that electric energy or electric signals into which the detected pressure is converted are amplified and output. The electric output signals put out are led to a pair of terminals 21 which each are inserted in the bottom portion 301 of the casing 3, and partially disposed outside the casing 3. The portions of the terminals 21 disposed outside are surrounded by a cylindrical projection 23 which is constructed so as to build up a coupler in cooperation with a plug 25, shown in FIG. 2.

A fine vent hole 27 is formed in the bottom portion 301 so as to pass through near the terminals 21, particularly between the terminals 21. The plug 25 holds therein a pair of female outer terminals 29 which are connected to a pair of lead wires 31 coated with insulating material. When the plug 25 is inserted into the projection 23, the terminals 21 are inserted in the female outer terminals 29. In this condition, the air vent hole 27 communicates with the atmosphere through an expanded air passage or space 33 defined by the casing 3 and the plug 25 and a plurality of fine air passages or gaps 35 defined between the projection 23 and the plug 25, gaps 37 between the terminals 21 and the female terminals 29.

On the coupler portion, a flexible cover 39 made of a resilent material such as rubber is provided, one end 38 of which is mounted airtightly on the projection 23 and the other 40 is mounted on the pair of lead wires 31. Between the cover 39 and the joining portions 42 of the pair of the lead wires 31, fine air passages 41 are formed so that the interior of the cover 39 communicates therethrough with the atmosphere. Therefore, when the resilent cover 39 is provided, the above-mentioned air passage means further includes the fine air passages 41.

In case where the pressure transducer constructed thus is used for detecting the pressure in the suction pipe of an engine, the pressure transducer can be disposed in an engine room (not shown) of an automobile, with the pressure induction passage 305 being fluidly connected to the suction pipe (not shown) of the engine. The lead wires 31 are electrically connected to a pressure indicator (not shown) disposed in the car room of the automobile.

When the pressure in the suction pipe of the engine is introduced into the silicon diaphragm 9, the pressure difference between the pressure and the reference pressure or the atmospheric pressure in the closed chamber 8 is detected and converted to electric signals by piezoresistance effects of the silicon diaphragm 9, the electric signals are amplified by the operational amplifier 17, and transmitted to the pressure indicator through the terminals 21, the outer terminals 29, and the lead wires 31, whereby the driver operating the engine in the car room sees the pressure in the suction pipe of the engine.

If the temperature in the surroundings of the transducer changes, the volume of air in the closed chamber 8 changes, so that the air or the atmosphere flows out of or into the closed chamber 8 through the air passage means, that is, through the air vent hole 27, the space 33, the gaps 35, 37 and the fine air passage 41, whereby the reference pressure is kept substantially constant.

Water in the surroundings of the pressure transducer is prevented from penetrating into the closed chamber 8 through the air passage means, because the air passage means comprises the air vent hole 27 disposed near the terminals 21, and direct communication between the closed chamber 8 and the atmosphere by the air vent hole 27 can be prevented by the plug 25 inserted into the cylindrical projection 23. When the plug 25 is inserted, the air passage means comprises, in addition to the air vent hole 27, the gaps 35 between the projection 23 and the plug 25, the gaps 37 between the terminals 21 and the outer terminals 29, and the fine air passage 41 formed between the pair of lead wires 31 and the cover 39. Therefore, the air passage means becomes fine complicated passages so that it is difficult for water to penetrate into the closed chamber 8. Further, the air passage means includes the space 35, so that the section area of the air passage means changes greatly from the air vent hole 27 toward the fine air passage 41. Therefore, it is very difficult for water to penetrate into the closed chamber 8. Further, the air vent hole 27 is disposed under the bottom face 306 of the closed chamber 8, so that water is further difficult to penetrate into the closed chamber 8.

Thus, in this embodiment of the pressure transducer, the change of the reference pressure due to the change of the surrounding temperature can be prevented while preventing water from penetrating into the closed chamber 8, so that the pressure transducer is high in performance and reliability. Further, the pressure transducer can be installed in the engine room. Therefore, even if positive pressure is applied, for example, in the suction pipe of a turbocharger car engine so that a pressure induction passage is disengaged, the driver in the car room is not harmed directly. Additionally, the cylindrical projection 23 is provided on the casing 3 as a unitary piece. Therefore, the terminals 21 can be inserted surely into the outer terminals 27.

Another embodiment of a pressure transducer for automobiles will be explained referring to FIG. 3. This embodiment differs from the above-mentioned embodiment only in that a casing 3A has a cylindrical boss 50 and a sealing member 51 is provided on the air vent hole 27. The other construction is the same as the construction shown in FIG. 1 so that the explanation on the construction and operation is omitted.

Figure 3:
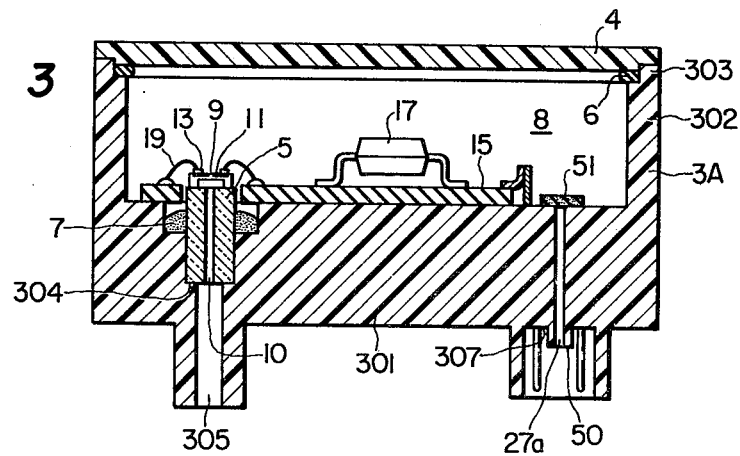
FIG. 3 is a sectional view of another embodiment of a pressure transducer according to the invention.

In FIG. 3, an air vent hole 27a is made in the bottom 301 and the boss 50 of the casing 3A so that the air passage of the air vent hole 27a becomes longer than the airvent hole 27. The sealing member 51 has properties of a good aeration and non-wetability, and it is disposed on the bottom portion 301 of the casing 3A so that air in the closed chamber 8 passes through the sealing member 51, and the air vent hole 27a. As the sealing member 51, unwoven cloth or sponge with continuous air holes is used. When they are coated with silicon resin, non-wetability is elevated further.

In this embodiment, when the temperature in the surroundings changes, the air in the closed chamber 8 or the atmosphere in the surroundings of the transducer flows out of or into the closed chamber 8 through the sealing member 51, air vent hole 27a, so that the reference pressure is kept substantially constant. Water penetration into the closed chamber 8 is prevented by the elongate air vent 27a, and the sealing member 51. The cylindrical boss 50 prevents water on the outer surface of the casing 3A from penetrating into the air vent hole 27a by spreading of water on the surface 307.

Figure 2:
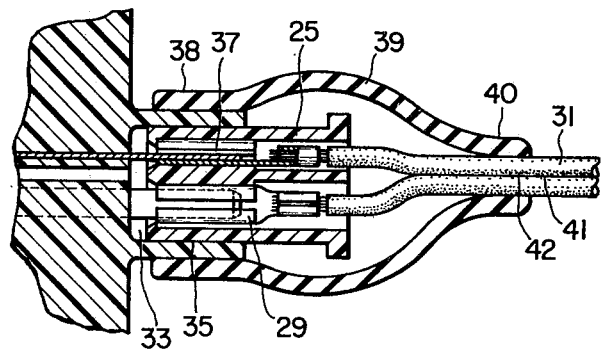
FIG. 2 is a sectional view of a part of the pressure transucer shown in FIG. 1 and a plug inserted into the casing of the pressure transducer.

When the plug 25 is inserted into the cylindrical projection 23, the space 33, the gaps 35, 37 and the fine air passage 41 are formed in the same manner as the embodiment in FIGS. 1, 2 so that the water prevention is raised further.

What is claimed is:

1. A pressure transducer for automobiles comprising a closed housing means,
means disposed in the closed housing means for converting pressure into electric energy,
terminals electrically connected to said means for converting pressure into electric energy and partially disposed out of said closed housing means, and
air passage means provided in said closed housing means near said terminals for passing air therethrough so that the interior of said closed housing means will communicate with the atmosphere, whereby the reference pressure in the interior of said closed housing means is kept substantially constant, further including a wall surrounding said terminals disposed out of said closed housing and a plug inserted in said wall and having outer terminals electrically connected to said terminals whereby the interior of said closed housing communicates with the atmosphere through gaps defined in said plug and between said wall and said plug.

2. The pressure transducer as defined in claim 1, wherein said cylindrical wall is disposed below said closed housing and further, a cover covering over said cylindrical wall and a lead connected to said plug is included.

3. A pressure transducer for automobiles comprising:

a casing having a bottom portion and a side wall extending from the one side of said bottom portion and forming an open end of said side wall;

means for closing said open end airtightly thereby to provide a closed chamber;

means provided in said bottom portion of said casing for receiving pressure to be detected and converting the pressure into electric signals;

means disposed in said closed chamber for amplifying electric signals;

terminals electrically connected to said amplifying means and partially inserted in said bottom portion of said casing so that one end of said terminals is disposed out of said closed chamber;

means with air passage formed in said bottom portion about the positions of said terminals for preventing water from penetrating into said chamber, said means with air passage communicating with the atmosphere;

wherein said means with air passage includes a projection projecting from said bottom portion of said casing so as to surround said terminals and said air passage, further including a plug having therein outer terminals and lead wires electrically connected to said outer terminals, and inserted in said projection so that said terminals contact with said outer terminals, wherein said air passage comprises an air hole made in said bottom portion of said casing, a space defined by said wall, gaps between said wall and said plug and gaps between said terminals and said outer terminals.

4. The pressure transducer for automobiles as defined in claim 3, further including a flexible cover provided over said cylindrical projection, said plug, and said lead wire near said plug for elevating waterproof effect, wherein said air passage means further includes gaps defined between said cover and said lead wires.

5. The pressure transducer for automobiles as defined in claim 3 or 4 wherein said means with air passage includes a member disposed in said closed chamber, said member having a plurality of fine air passages and a property of non wetability.

6. The pressure transducer for automobiles as defined in claim 5, wherein said means with air passage includes a cylindrical boss defining a part of an air hole provided in said bottom portion of said casing, said cylindrical boss slightly projecting from said bottom portion of said casing in said cylindrical wall so that said fine air passage is elongated to raise a water-proof effect.

* * * * *